United States Patent
Thompson et al.

(10) Patent No.: US 12,209,382 B2
(45) Date of Patent: Jan. 28, 2025

(54) AUTOMATED WORK TOOL DEPRESSURIZATION CIRCUIT AND METHOD

(71) Applicant: Caterpillar Inc., Peoria, IL (US)

(72) Inventors: Mark William Thompson, Manhattan, KS (US); Trent Randall Stefek, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 188 days.

(21) Appl. No.: 17/881,345

(22) Filed: Aug. 4, 2022

(65) Prior Publication Data
US 2024/0044099 A1    Feb. 8, 2024

(51) Int. Cl.
*E02F 3/36*    (2006.01)
*G05D 16/20*    (2006.01)

(52) U.S. Cl.
CPC ....... *E02F 3/3654* (2013.01); *G05D 16/2013* (2013.01)

(58) Field of Classification Search
CPC .......... E02F 3/3654; G05D 16/2013
See application file for complete search history.

(56) References Cited

U.S. PATENT DOCUMENTS

| | | | |
|---|---|---|---|
| 4,955,779 A | 9/1990 | Knackstedt | |
| 6,837,319 B2 | 1/2005 | Dvorak et al. | |
| 7,198,060 B2 | 4/2007 | Hiser | |
| 8,387,289 B2 * | 3/2013 | Hanakawa | E02F 9/2242 37/348 |
| 2003/0233773 A1 * | 12/2003 | Mieger | E02F 9/2271 37/468 |
| 2011/0061755 A1 * | 3/2011 | Hanakawa | F15B 11/028 137/637 |
| 2015/0020892 A1 * | 1/2015 | Behr | E02F 3/3672 137/15.09 |
| 2020/0217040 A1 | 7/2020 | Hill et al. | |

FOREIGN PATENT DOCUMENTS

| | | | | |
|---|---|---|---|---|
| CN | 111928042 A | 11/2020 | | |
| WO | WO-2016107703 A1 * | 7/2016 | ............ | E02F 3/308 |
| WO | WO-2021042185 A1 * | 3/2021 | ............ | F16L 37/34 |

OTHER PUBLICATIONS

Caterpillar Inc., "Cat Auto-Connect Quick-Coupler (CWAC)", Advanced Mining Solutions, Feb. 28, 2022, pp. 1-3, https://www.advanced-mining.com/artikel.php?id=214.
Written Opinion and International Search Report for Int'l. Patent Appln. No. PCT/US2023/071391, mailed Oct. 27, 2023 (11 pgs).

* cited by examiner

*Primary Examiner* — Saul Rodriguez
*Assistant Examiner* — Brendan P Tighe

(57) ABSTRACT

Disclosed is a control system for depressurizing a work tool auxiliary circuit fluidly connected to a work tool coupled to a work machine by a quick coupler. The system may comprise a controller configured to: receive an unlock signal for the work tool; receive tool data associated with the work tool, the tool data including a target pressure for the work tool auxiliary circuit or a release duration for the relief valve; and in response to the unlock signal and the tool data, automatically actuate opening of the relief valve (a) for the release duration or (b) until the target pressure is reached in the work tool auxiliary circuit or machine-side circuit or (c) to reach and maintain the target pressure in the work tool auxiliary circuit or machine-side circuit.

20 Claims, 9 Drawing Sheets

AUTOMATED WORK TOOL DEPRESSURIZATION CIRCUIT AND METHOD

TECHNICAL FIELD

The present disclosure generally relates to hydraulic systems in a work machine, and more particularly relates to depressurizing hydraulic work tool auxiliary circuits.

BACKGROUND

Work machines such as an excavator, backhoe, skid steer, wheel loader, tractor, etc., are further provided with a quick coupler that is used to attach and detach various work tool attachments commonly referred to as implements to the work machine. More specifically, some implements are connected at the end of a working assembly generally known as the boom and arm of a work machine. Generally, quick couplers are heavy-duty industrial components that allow for the fast and efficient changing of buckets, hammers, grapples, compactors, rakes, and other implements to the arm of a work machine. Without a quick coupler, workers are required to manually drive out pins, typically using a hammer.

Hydraulic connecting quick couplers provide an improvement over the standard quick couplers. Standard quick couplers only physically connect the work implement to the machine and still require the hydraulic lines to be manually connected. Hydraulic connecting quick couplers physically connect both the implement as well as the hydraulic lines, if equipped, to the machine. Hydraulic connecting quick couplers allow for a work machine to be able to switch between different hydromechanical or non-hydromechanical work tools quickly by using the hydraulic system of the work machine and can be operated by a control device from the cab of the work machine. The hydraulic system of the work machine generally connects to the quick coupler via hydraulic lines in the hydraulic system. Hydraulic lines are generally provided throughout the work machine. The hydraulic lines generally utilize hydraulic couplings which create fluid tight seals to maintain pressure of hydraulic fluid in the circuit.

US Publication No. 2020/0217040, published Jul. 9, 2020, discloses a coupler for coupling an attachment to an excavator or other machine that comprises a powered actuator for actuating a locking member into and out of said locking state, a first power coupling unit, and a second actuator for moving the power coupling unit into and out of an engaging position in which it is engagable with a corresponding second power coupling unit of the attachment. The coupler is configured to cause the first power coupling unit to move into the engaging position after said latching member adopts the locking state and, when decoupling the attachment from the coupler, to cause said latching member to remain in its locking state until after the first power coupling unit is moved out of its engaging position. While beneficial, a need exists for an improved hydraulic system which facilitates attaching and detaching work implements to quick couplers.

SUMMARY OF THE DISCLOSURE

In accordance with one aspect of the disclosure, a control system for depressurizing a work tool auxiliary circuit fluidly connected to a work tool that is coupled to a work machine by a quick coupler is disclosed. The work tool may include a work tool valve block. The quick coupler may include a quick coupler valve block and a lock member movable between a locked position and an unlocked position. When in the locked position, the work tool valve block and quick coupler valve block may be mated and in fluid communication. When in the unlocked position, the work tool valve block and quick coupler valve block may be disconnectable. The work tool auxiliary hydraulic circuit may include a reservoir and a relief valve fluidly connected to the quick coupler valve block and to the fluid reservoir. The system may comprise a controller configured to: receive an unlock signal for the work tool; receive tool data associated with the work tool, the tool data including a target pressure for the work tool auxiliary circuit or a release duration for the relief valve; and in response to the unlock signal and the tool data, automatically actuate opening of the relief valve (a) for the release duration or (b) until the target pressure is reached in the work tool auxiliary circuit or machine-side circuit or (c) to reach and maintain the target pressure in the work tool auxiliary circuit or machine-side circuit.

In accordance with another aspect of the disclosure, a method of depressurizing a work tool auxiliary circuit fluidly connected to a work tool that is coupled to a work machine by a quick coupler is disclosed. The work tool may include a work tool valve block. The quick coupler may include a quick coupler valve block and a lock member movable between a locked position and an unlocked position. The work tool auxiliary hydraulic circuit may include a reservoir and a first relief valve fluidly connected to the quick coupler valve block and to the fluid reservoir. The method may comprise: receiving an unlock signal for the work tool; receiving tool data associated with the work tool, the tool data including a target pressure for the work tool auxiliary circuit or a release duration for the first relief valve; in response to the unlock signal and the tool data, automatically actuating, by a controller, opening of the first relief valve (a) for the release duration or (b) until the target pressure is reached in the work tool auxiliary hydraulic circuit or machine-side circuit or (c) to reach and maintain the target pressure in the work tool auxiliary circuit or machine-side circuit; and moving the lock member to the unlocked position.

In accordance with another aspect of the disclosure, a method of depressurizing a work tool auxiliary circuit fluidly connected to a work tool is disclosed. The work tool is coupled to a work machine by a quick coupler. The work tool may include a work tool valve block. The quick coupler may include a quick coupler valve block and a lock member movable between a locked position and an unlocked position. The work tool auxiliary hydraulic circuit may include a reservoir and a first relief valve fluidly connected to the quick coupler valve block and to the fluid reservoir. The method may comprise: receiving a lock signal for the work tool; receiving tool data associated with the work tool, the tool data including a target pressure for the work tool auxiliary circuit or a release duration for the first relief valve; automatically actuating, by the controller, opening of the first relief valve: (a) for the release duration or (b) until the target pressure is reached in the work tool auxiliary circuit or machine-side circuit or (c) to reach and maintain a target pressure in the work tool auxiliary circuit or machine-side circuit before and/or during locking of the quick coupler to the work tool via movement of the lock member to the locked position; and moving the lock member from the unlocked position to the locked position to lock the quick coupler to the work tool.

These and other aspects and features of the present disclosure will be better understood upon reading the following detailed description when read in conjunction with the accompanying drawings.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Figure 1:
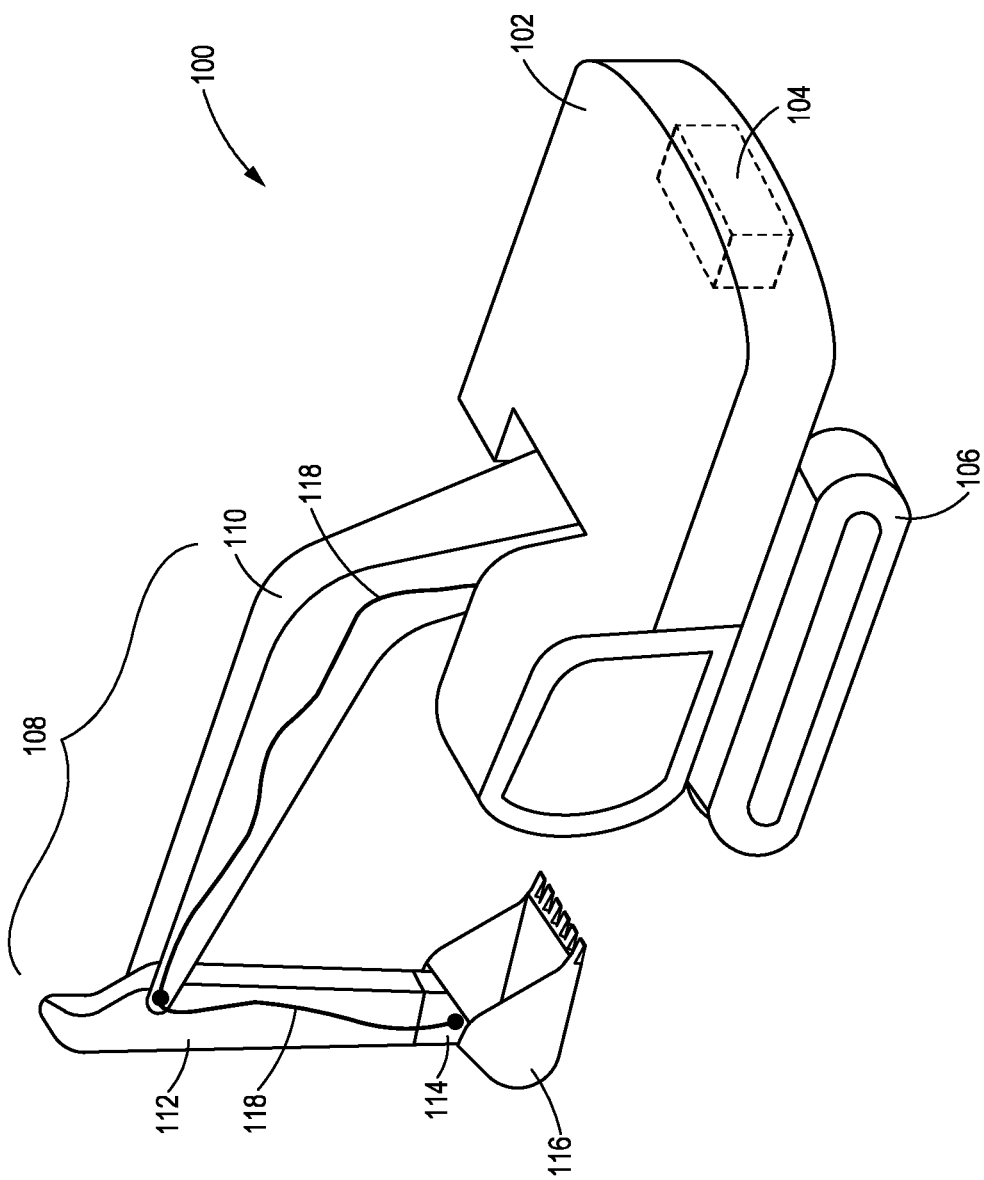
FIG. 1 is a perspective view of an exemplary work machine that utilizes the teachings of this disclosure.

Referring now to the drawings, and with specific reference to FIG. 1, an exemplary work machine 100 is shown, illustrated as an excavator. While the following detailed description describes an exemplary aspect in connection with the excavator, it should be appreciated that the description applies equally to the use of the present disclosure in other work machines including, but not limited to, backhoes, front-end loaders, skid steers, wheel loaders, and tractors, as well.

The work machine 100 comprises a frame 102 supporting an engine 104. The frame 102 is supported on ground engaging elements 106 illustrated as continuous tracks. It should be contemplated that the ground engaging elements 106 may be any other type of ground engaging elements 106 such as, for example, wheels, etc. The work machine 100 further includes a working assembly 108 extending from the frame 102 for conducting work, such as, for example, excavating landscapes or otherwise moving earth, soil, or other material at a dig site. The frame 102 may be an upper swiveling body common with excavators and work machines in the agricultural and construction industries.

As illustrated in one embodiment, the working assembly 108 may include a boom 110, an arm 112, a quick coupler 114 coupled to the arm 112, and a work tool 116 configured to remove earth, soil, and other material from a work site. The work tool 116 may be a bucket, dipper, hammer, thumb, hydromechanical tool, or other attachment that couples to the quick coupler 114 for operation by the work machine 100.

The work machine 100 utilizes the quick coupler 114 to attach and detach the work tool 116 to the work machine 100. The work tool 116 is configured to be attached/detached to the quick coupler 114 and one or more hydraulic lines 118 disposed on the work machine. In exemplary embodiments, the quick coupler 114 is a hydraulic connecting quick coupler configured to connect to a plurality of hydraulic lines 118.

Figure 3:
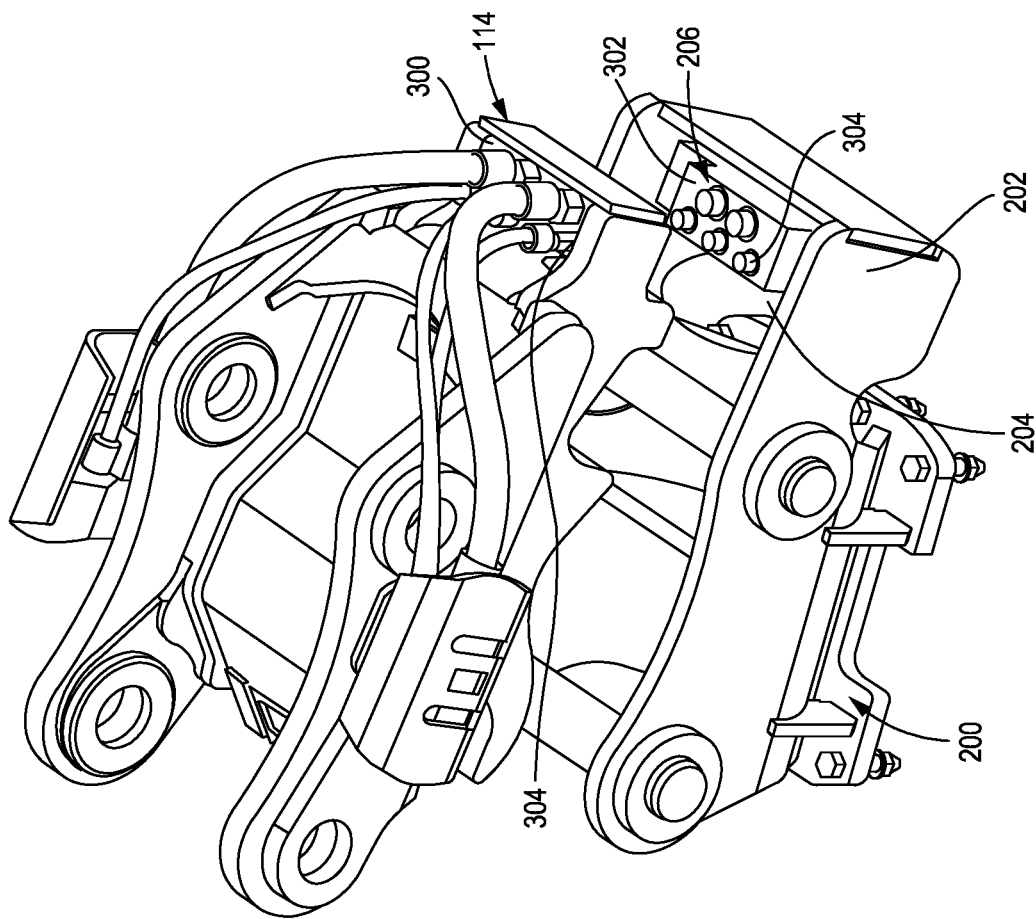
FIG. 3 is an enlarged, perspective view of the quick coupler exploded from a work tool bracket.
Figure 2:
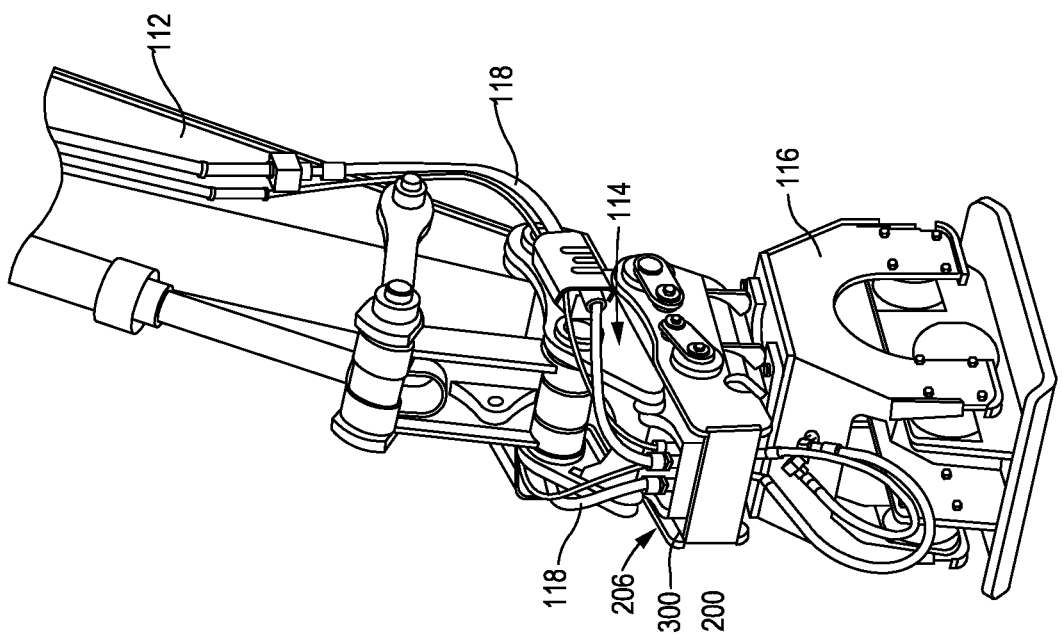
FIG. 2 is an enlarged, perspective view of a quick coupler coupled to a work tool.

Referring now to FIG. 2, the quick coupler 114 is illustrated as coupled to the work tool 116. As shown in FIG. 2, the quick coupler 114 is mounted to a work tool bracket 200 which is further mounted to the work tool 116. FIG. 3 illustrates the quick coupler 114 exploded from the work tool bracket 200. As shown in FIG. 3, the work tool bracket 200 may include a bracket frame 202 that defines a cavity 204. The work tool bracket 200 may further include a work tool valve block 302 configured to mate with a quick coupler valve block 300. The work tool valve block 302 may be disposed in the cavity 204.

Figure 14:
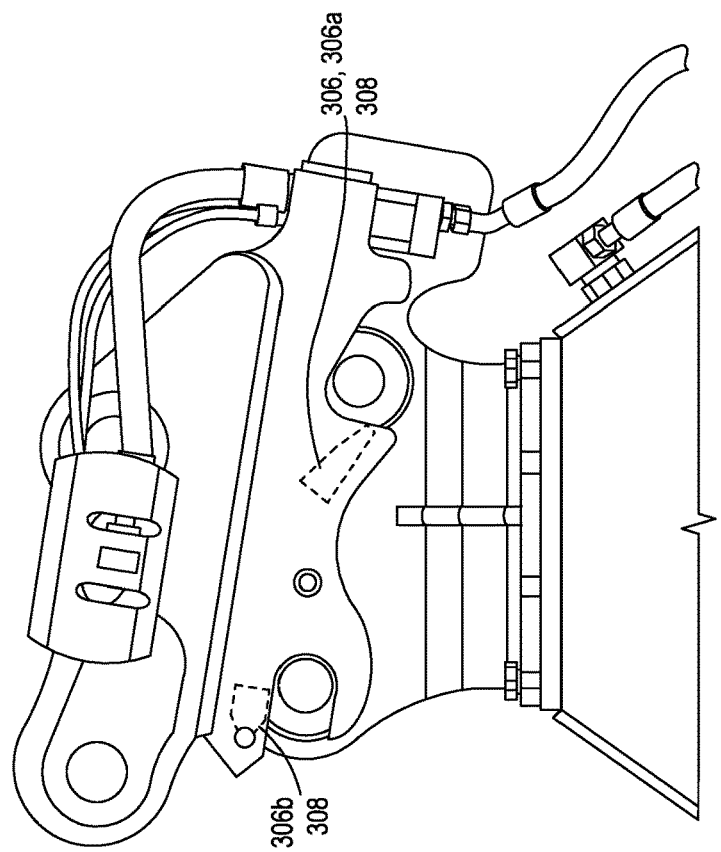
FIG. 14 is an enlarged view illustrating the lock members of a quick coupler in the locked position.
Figure 15:
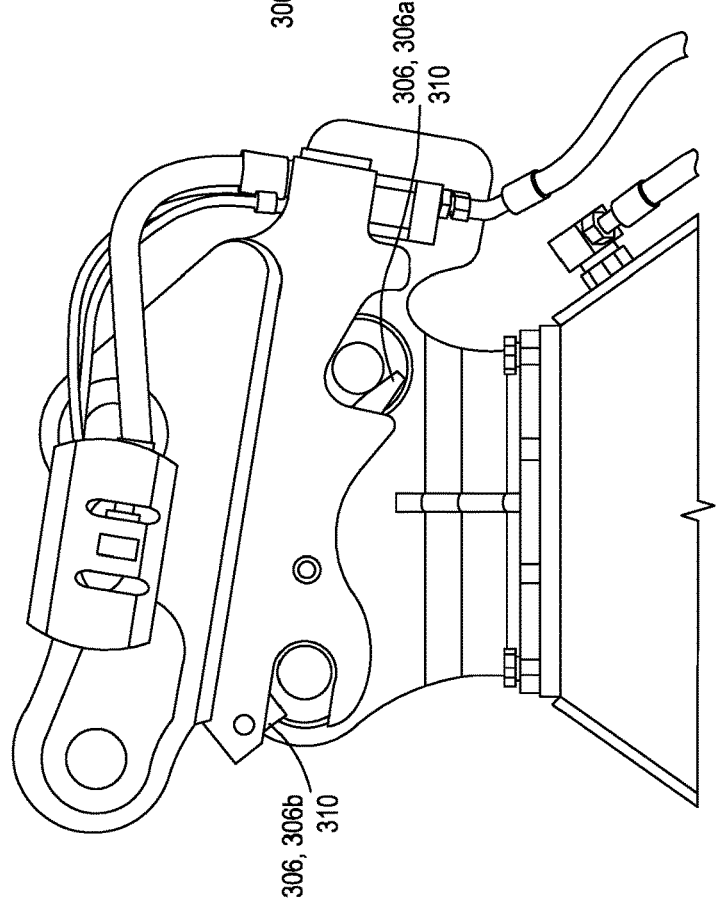
FIG. 15 is an enlarged illustrating the lock members of a quick coupler in the unlocked position.

As illustrated in FIG. 3, the quick coupler 114 comprises a quick coupler valve block 300 configured to mate with the work tool valve block 302 (of the work tool bracket 200). The quick coupler 114 further comprises one or more lock members 306 (FIGS. 14-15) movable between an unlocked position 308 (FIG. 15) and a locked position 310 (FIG. 14). In the exemplary embodiment, the quick coupler 114 includes a primary lock member 306a and a secondary lock member 306b. The lock members 306 (e.g., primary and secondary lock members 306a, 306b) are configured to releasably secure the quick coupler 114 to the work tool 116 (FIGS. 14-15). When secured by the lock members 306 (e.g., primary and secondary lock members 306a, 306b), the quick coupler 114 and work tool bracket 200 may be in the fully connected state. When the quick coupler 114 and work tool bracket 200 are in the fully connected state, the quick coupler valve block 300 and the work tool valve block 302 allow flow to pass between the work tool 116 and the quick coupler 114. Whereas, when the quick coupler 114 and the work tool bracket 200 are in the fully disconnected state, the quick coupler valve block 300 and the work tool valve block 302 are disconnected and do not allow flow to transfer between the work tool 116 and the quick coupler 114. The quick coupler valve block 300 and work tool valve block 302 may also be referred to collectively as a hydraulic block 206. The quick coupler valve block 300 is configured to be fluidly connected to and disconnected from the work tool valve block 302. Similarly, the work tool valve block 302 is configured to be fluidly connected to and disconnected from the quick coupler valve block 300. Hydraulic lines 118 (FIG. 2) are connected hydraulic couplings 304 (FIG. 3). The hydraulic couplings 304 are installed within the quick coupler valve block 300 and work tool valve block 302. The hydraulic couplings 304 are configured to create a fluid tight seal. The hydraulic couplings 304 may have two parts: a coupling body (socket or female end) and a coupling nipple (male end) that connect a hydraulic line 118 (FIG. 2) to the quick coupler valve block 300 of the quick coupler 114. Hydraulic coupling 304 (FIG. 3) connection types may include push-to-connect, pull-to-connect, threaded connections, quick disconnect couplings and universal interchanges generally known in the arts. The hydraulic couplings 304 are configured to control spills, air inclusion, and disconnects with special features such as flush-face designs, self-sealing poppet valves, single- or double-shutoff valves, and sleeves (automatic, manual, locking).

One or more of the hydraulic lines 118 (FIG. 2) may be utilized for the main operations of the work tool 116 and one or more of the hydraulic lines 118 may be utilized for secondary operations such as rotating, tilting, opening, and closing of the work tool 116. One or more of the hydraulic lines 118 may be utilized for providing hydraulic fluid from a pressure source 402 (see FIG. 4) to a work tool auxiliary circuit 400 that is configured to provide hydraulic fluid to the work tool 116 coupled to (e.g., the arm 112 of) the work machine 100.

Figure 4:
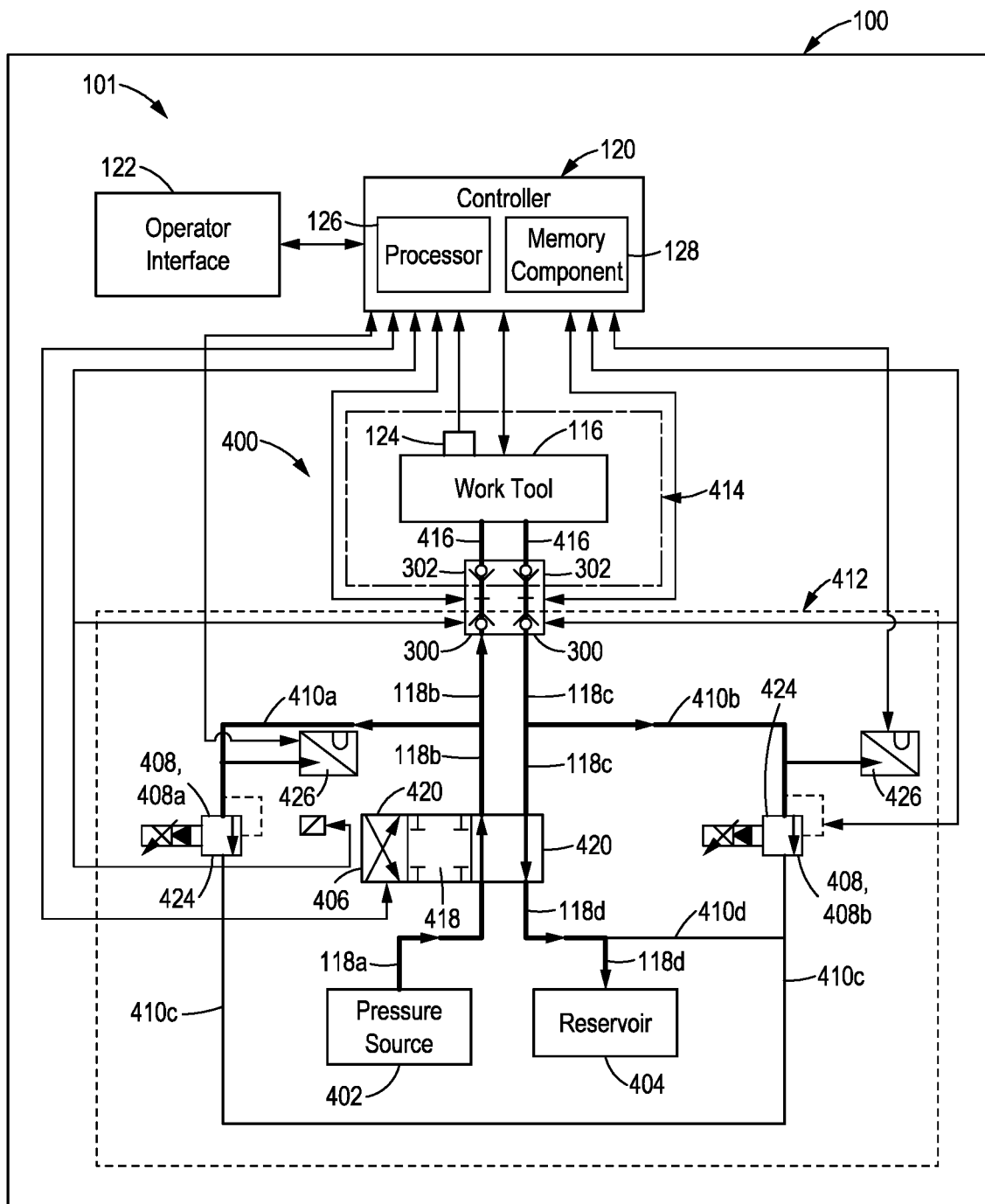
FIG. 4 is a simplified exemplary schematic diagram of a control system for depressurizing an exemplary (hydraulic) work tool auxiliary circuit of a work machine.

FIG. 4 illustrates a simplified exemplary control system 101 for depressurizing an exemplary work tool auxiliary circuit 400 of a work machine 100. For clarity purposes the schematic in FIG. 4 illustrates a work tool auxiliary circuit 400 for a given function, although for other functions additional elements (e.g., control valves 406, relief valves 408 etc.) may be utilized. The work tool auxiliary circuit 400 comprises a machine-side circuit 412 disposed on the work machine 100 and a too-side circuit 414. The work tool auxiliary circuit 400 may include one or more pressure sensors 426.

The tool-side circuit 414 (of the work tool auxiliary circuit 400) may comprise one or more tool-side hydraulic lines 416 disposed on/in the work tool 116 that are configured to carry hydraulic fluid to the work tool valve block 302 from the work tool 116 or hydraulic fluid received from the work tool valve block 302 to the work tool 116.

The machine-side circuit 412 (of the work tool auxiliary circuit 400) may comprise: one or more hydraulic line(s) 118 (*a-d*) disposed on the work machine 100 and configured to provide/carry hydraulic fluid; a pressure source 402; a reservoir 404; one or more control valves 406; one or more relief valves 408*a*, 408*b*; and one or more depressurization line(s) 410 (*a-d*) configured to provide/carry hydraulic fluid.

The exemplary machine-side circuit 412 may include one or more pressure sensors 426. In the exemplary embodiment illustrated in FIG. 4, only one control valve 406 is shown and two relief valves 408, however in other embodiments, there may be a plurality of control valves and greater or few quantities of relief valves 408.

The control valve 406 is configured to regulate the distribution of hydraulic fluid pumped by the pressure source 402 throughout the work tool auxiliary circuit 400. The control valve 406 is moveable between a blocked position 418 and one or more flow positions 420. In the blocked position 418, the control valve 406 is configured to prevent hydraulic fluid from flowing through the control valve 406. In each of the flow positions 420, the control valve 406 is configured to allow hydraulic fluid to enter, flow through and exit the control valve 406. The control valve 406 may be a spool valve, a directional control valve, an electronically controlled valve, or the like. In the exemplary embodiment of FIG. 4, the control valve 406 is fluidly connected to the pressure source 402 by hydraulic line 118*a*, and the control valve 406 is fluidly connected to the quick coupler valve block 300 (of the hydraulic block 206) by hydraulic lines 118*b*, 118*c*. In addition, the control valve 406 is fluidly connected to the reservoir 404 by hydraulic line 118*d*. The control valve 406 is also fluidly connected to the relief valves 408*a*, 408*b* via hydraulic lines 118*b*, 118*c* and depressurize lines 410*a*, 410*b*.

Each relief valve 408*a*, 408*b* is configured to be moveable between a closed position 422 and an open position 424. In the closed position 422, the relief valve 408*a*, 408*b* is configured to prevent hydraulic fluid from flowing through the relief valve 408*a*, 408*b*. When in the open position 424, the relief valve 408*a*, 408*b* is configured to allow hydraulic fluid to enter, pass through and exit the relief valve 408*a*, 408*b*. The relief valve 408 may be an electromechanical valve including but not limited to depressurization valve, directional control valve, pressure control valve, flow control valve, a solenoid valve, or other valve. In the exemplary embodiments, each relief valve 408*a*, 408*b* may be solenoid pressure release valve (e.g., proportional pressure release valve). The relief valves 408 may be also utilized for functions other than depressurization (e.g., controlling work tool operating pressure during tool usage.) In the exemplary embodiment of FIG. 4, the relief valves 408*a*, 408*b* are each fluidly connected to the control valve 406 and to the quick coupler valve block 300 (of the hydraulic block 206) via the depressurization lines 410*a*, 410*b* and hydraulic lines 118*b*, 118*c*. The relief valves 408*a*, 408*b* are also fluidly connected to the reservoir 404 via depressurization lines 410*c*, 410*d* and hydraulic line 118*d*. The relief valves 408*a*, 408*b* are further configured to release pressure within the work tool auxiliary circuit 400 by, for example, fluidly connecting depressurization lines 410*a*, 410*b* to the reservoir 404 via depressurize lines 410*c*, 410*d* and hydraulic line 118*d*.

The pressure sensors 426 are configured to measure fluid pressure. In the exemplary embodiment discussed herein the pressure sensors 426 are disposed upstream of and proximal to the relief valve 408*a*, 408*b*.

The pressure source 402 is configured to provide hydraulic fluid under pressure to the work tool auxiliary circuit 400. For example, the pressure source 402 may be configured to pump hydraulic fluid throughout the work tool auxiliary circuit 400 creating pressure within the plurality of hydraulic lines 118 (*a-d*) and one or more depressurization lines 410*a*, 410*b* (when the relief valves 408*a*, 408*b* are in the closed position 422, as shown in FIG. 4). The pressure source 402 may be a pump or other pressure source, as known by those of ordinary skill in the art. In the exemplary embodiment of FIG. 4, the pressure source 402 is fluidly connected to the control valve 406 by hydraulic line 118a.

The reservoir 404 is configured to store a supply of hydraulic fluid. The reservoir 404 may be a tank or the like configured to store hydraulic fluid. The work tool auxiliary circuit 400 may utilize a variety of hydraulic fluid stored and supplied in the reservoir 404 such as oil, water, gas, or other generally known fluid used for hydraulic circuits and hydraulic systems, as generally known in the art. In the exemplary embodiment of FIG. 4, the reservoir 404 is fluidly connected to the control valve 406 by hydraulic line 118d, and is fluidly connected to relief valves 408a, 408b by hydraulic line 118d and depressurize lines 410c, 410d.

The control system 101 for depressurizing the work tool auxiliary circuit 400 includes a controller 120. The control system 101 may further include an operator interface 122. The control system 101 may further include a transmitter 124.

The operator interface 122 is in communication with the controller 120 and is configured to receive user input and to transmit signals (e.g., an unlock signal, lock signal) to the controller 120 based on user input (e.g., flipping a switch).

The transmitter 124 may be disposed on the work tool 116 or on the work machine 100. The transmitter 124 is in communication with the controller 120 and is configured to transmit tool data associated with the work tool 116 to the controller 120.

The controller 120 is configured to control depressurizing the work tool auxiliary circuit 400. The controller 120 is configured to receive an unlock signal from the operator interface 122 (based on user input) to unlock the quick coupler 114. The controller 120 is further configured to receive a lock signal from the operator interface 122 (based on user input) to lock the quick coupler 114. The controller 120 is further configured to receive/retrieve tool data associated with the work tool 116 from the operator interface 122, transmitter 124 and/or memory component 128.

The controller 120 may be configured to transmit control signals to the control valve 406 to move the control valve 406 from a blocked position 418 to a flow position 420 and vice versa, and may be configured to transmit control signals to relief valves 408a, 408b to move the relief valves 408a, 408b from a closed position 422 to an open position 424 and vice versa.

The controller 120 may include a processor 126 and a memory component 128. The controller 120 is in operable communication with the operator interface 122 and may be configured to receive/retrieve from the operator interface 122 tool data associated with the work tool 116. The controller 120 may be in operable communication with the transmitter 124 and may be configured to receive from the transmitter 124 tool data associated with the work tool 116. The controller 120 is in operable communication with the pressure sensors 426 and may be configured to receive/retrieve from the pressure sensors one or more pressure measurements associated with the work tool auxiliary circuit 400 or machine-side circuit 412.

The controller 120 may be configured, in some embodiments, to activate the unlocking of the quick coupler 114 (and the hydraulic block 206) by activating the movement of the one or more lock members 306 (FIGS. 14-15) to the unlocked position 308, and may be configured, in some embodiments, to activate locking of the quick coupler 114 (and the hydraulic block 206) by activating the movement of the one or more lock members 306 to the locked position 310.

The controller 120 may be configured to, in response to the unlock signal, automatically actuate opening of one or more relief valves 408a,408b for a release duration or until a target pressure is reached in (a portion of) the work tool auxiliary circuit 400 (e.g., in the hydraulic lines 118(b, c) and depressurize lines 410(a, b) and tool-side hydraulic lines 416). The pressure (target pressure) in the work tool auxiliary circuit 400 (e.g., in the hydraulic lines 118(b, c) and depressurize lines 410(a, b) and tool-side hydraulic lines 416) may be measured by one or more pressure sensors 426. In one exemplary embodiment, such pressure in the work tool auxiliary circuit 400 may be measured upstream of and proximal to the relief valves 408. The controller 120 may be configured to activate the quick coupler 114 to move the lock members 306 (e.g., primary lock member 306a, secondary lock member 306b) from a locked position 310 to the unlocked position 308. When the lock members 306 (e.g., in the exemplary embodiment, primary lock member 306a, secondary lock member 306b) are in the unlocked position 308, the work tool valve block 302 and quick coupler valve block 300 may be disconnectable (and the work tool 116 is disconnectable from the quick coupler 114 of the work machine 100).

The controller 120 may be configured to, in response to a lock signal, automatically actuate opening of one or more relief valves 408a,408b for a release duration or until a target pressure is reached in (a portion of) the machine-side circuit 412 (e.g., in the hydraulic lines 118(b, c) and depressurize lines 410(a, b)). The pressure (target pressure) in the machine-side circuit 412 (e.g., in the hydraulic lines 118(b, c) and depressurize lines 410(a, b)) may be measured by one or more pressure sensors 426. In one exemplary embodiment, such pressure in the machine-side circuit 412 may be measured upstream of and proximal to the relief valves 408. The controller 120 may, in some embodiments, automatically activate the quick coupler 114 to move the lock members 306 (e.g., in the exemplary embodiment, primary lock member 306a, secondary lock member 306b) from the unlocked position 308 to the locked position 310 to lock the work tool 116 to the quick coupler valve block 300.

In some embodiments, the controller 120 may continue to maintain/regulate pressure around the target pressure by maintaining the one or more relief valves 408a,408b in the open position 424, as needed to maintain the target pressure, during the locking (movement of the lock members 306 (e.g., in the exemplary embodiment, primary lock member 306a, secondary lock member 306b to the locked position 310) or unlocking (movement of the lock members 306 (e.g., in the exemplary embodiment, primary lock member 306a, secondary lock member 306b to the unlocked position 308).

The processor 126 may be a microcontroller, a digital signal processor (DSP), an electronic control module (ECM), an electronic control unit (ECU), a field-programmable gate array (FPGA), a microprocessor or any other suitable processor as known in the art. The processor 126 may execute instructions and generate control signals for determining the release duration or the target pressure associated with a work tool, and/or activating the relief valves for the release duration or until the target pressure is achieved in the work tool auxiliary circuit 400 or the machine-side circuit 412 and/or regulating/maintaining pressure (at about the target pressure) during locking and/or unlocking of the lock members 306. Such instructions may be read into or incorporated into a computer readable medium, such as the memory component 128 or provided external to the processor 126. In alternative embodiments, hard wired circuitry may be used in place of, or in combination with, software instructions to implement a control method.

The term "computer readable medium" as used herein refers to any non-transitory medium or combination of media that participates in providing instructions to the processor 126 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 120 is not limited to one processor 126 and memory component 128. The controller 120 may include several processors 126 and memory components 128. In an embodiment, the processors 126 may be parallel processors that have access to a shared memory component(s) 128. In another embodiment, the processors 126 may be part of a distributed computing system in which a processor 126 (and its associated memory component 128) may be located remotely from one or more other processor(s) 126 (and associated memory components 128) or FPGA(s) that are part of the distributed computing system.

The controller 120 may also be configured to retrieve from the memory component 128, tool data, formulas and other data necessary for the calculations and determinations discussed herein.

Also disclosed is a method of depressurizing a work tool auxiliary circuit 400 fluidly connected to a work tool 116 that is coupled to a work machine 100 by a quick coupler 114, the work tool 116 including a work tool valve block 302, the quick coupler 114 including a quick coupler valve block 300 and a lock member 306 movable between a locked position 310 and an unlocked position 308, the work tool auxiliary circuit 400 including a reservoir 404 and a first relief valve 408 fluidly connected to the quick coupler valve block 300 and to the fluid reservoir 404. The method may comprise: receiving an unlock signal for the work tool 116; receiving tool data associated with the work tool 116, the tool data including a target pressure for the work tool auxiliary circuit 400 or a release duration for the first relief valve 408; and in response to the unlock signal and the tool data, automatically actuating, by a controller 120, opening of the first relief valve 408 for (a) the release duration or (b) until the target pressure is reached in the work tool auxiliary circuit 400 or machine-side circuit 412 or (c) to reach and maintain the target pressure in the work tool auxiliary circuit 400 or machine-side circuit 412 before and/or during locking of the quick coupler 114 to the work tool 116 via movement of the lock member 306 to the locked position 310; and moving the lock member 306 from the unlocked position 308 to the locked position 310 to lock the quick coupler 114 to the work tool 116.

Also disclosed is a method of depressurizing a work tool auxiliary circuit 400 fluidly connected to a work tool 116 that is coupled to a work machine 100 by a quick coupler 114, the work tool 116 including a work tool valve block 302, the quick coupler 115 including a quick coupler valve block 300 and a lock member 306 movable between a locked position 310 and an unlocked position 308, the work tool auxiliary circuit 400 including a reservoir 404 and a first relief valve 408 fluidly connected to the quick coupler valve block 300 and to the fluid reservoir 404. The method may comprise: receiving a lock signal for the work tool 116; receiving tool data associated with the work tool 116, the tool data including a target pressure for the work tool auxiliary circuit 400 or a release duration for the first relief valve 408; automatically actuating, by the controller 120, opening of the first relief valve 408 (a) for the release duration or (b) until the target pressure is reached in the work tool auxiliary circuit 400 or machine-side circuit 412 or (c) to reach and maintain the target pressure in the work tool auxiliary circuit 400 or machine-side circuit 412 before and/or during locking of the quick coupler 114 to the work tool 116 via movement of the lock member 306 to the locked position 310; and moving the lock member 306 from the unlocked position 308 to the locked position 310 to lock the quick coupler 114 to the work tool 116.

INDUSTRIAL APPLICABILITY

In operation, the present disclosure may find applicability in many industries including, but not limited to, the construction, earth-moving, and agricultural industries. Specifically, the technology of the present disclosure may be used for hydraulic depressurization in work machines 100 including, but not limited to, excavators, backhoes, skid steers, wheel loaders, tractors, and the like, comprising a quick coupler 114 for easily connecting and disconnecting work tools 116 such as hammers, buckets, dippers, dig tools, and the like. While the foregoing detailed description is made with specific reference to excavators, it is to be understood that its teachings may also be applied onto the other work machines 100 such as backhoes, skid steers, wheel loaders, tractors, mulchers, and the like.

Figure 12:
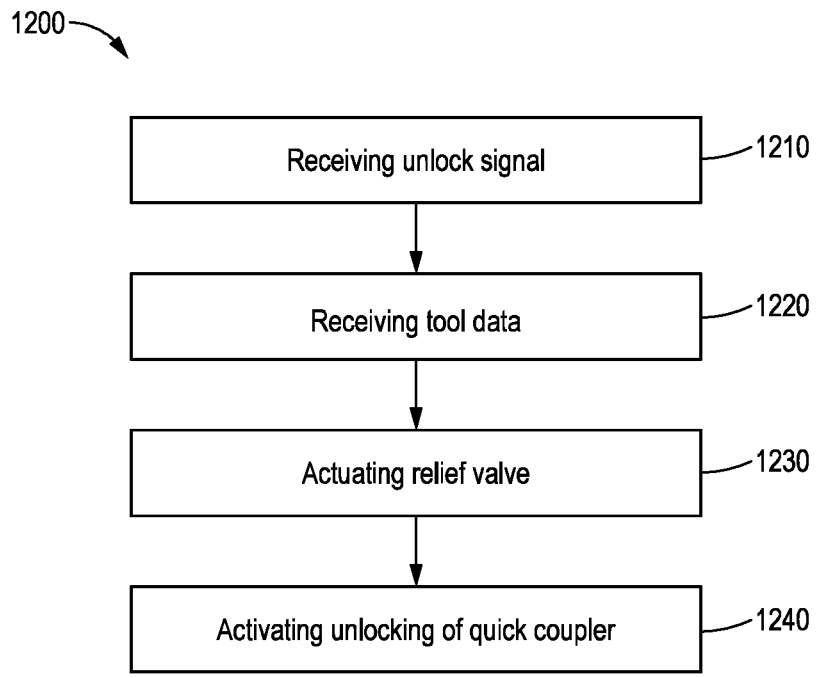
FIG. 12 is a flow diagram of one exemplary method of depressurizing a work tool auxiliary circuit during the process of uncoupling a work tool to the machine, according to the present disclosure.
Figure 13:
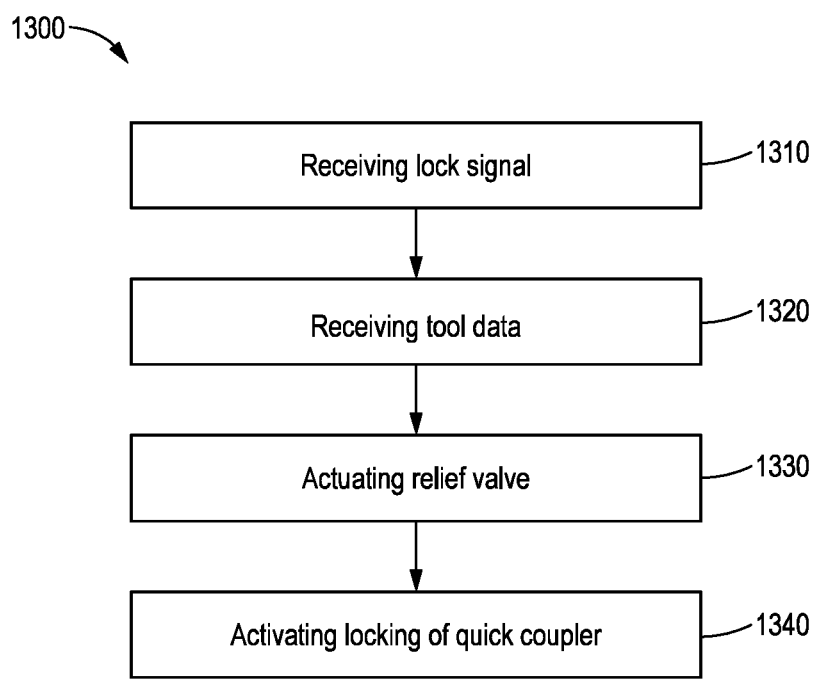
FIG. 13 is a flow diagram of one exemplary method of depressurizing a work tool auxiliary circuit of a machine during the process for coupling a work tool to the machine, according to the present disclosure.

In operation, the controller 120 may be configured to operate according to predetermined methods 1200-1300, as shown for example, in FIGS. 12-13.

FIG. 12 is an exemplary flowchart is illustrated showing sample blocks which may be followed in a method 1200 of depressurizing a (hydraulic) work tool auxiliary circuit 400 of a work machine 100.

Block 1210 includes receiving, by the controller 120, an unlock signal for unlocking the quick coupler 114 so that the work tool 116 may be disconnected from the work machine 100. The unlock signal may be received from an operator interface 122 based on user input entered into the operator interface 122 by an operator. For example, in one embodiment, the operator may flip a switch(s) within an operator station to trigger the sending of the unlock signal (to unlock the work tool 116) by the operator interface 122 to the controller 120.

Figure 5:
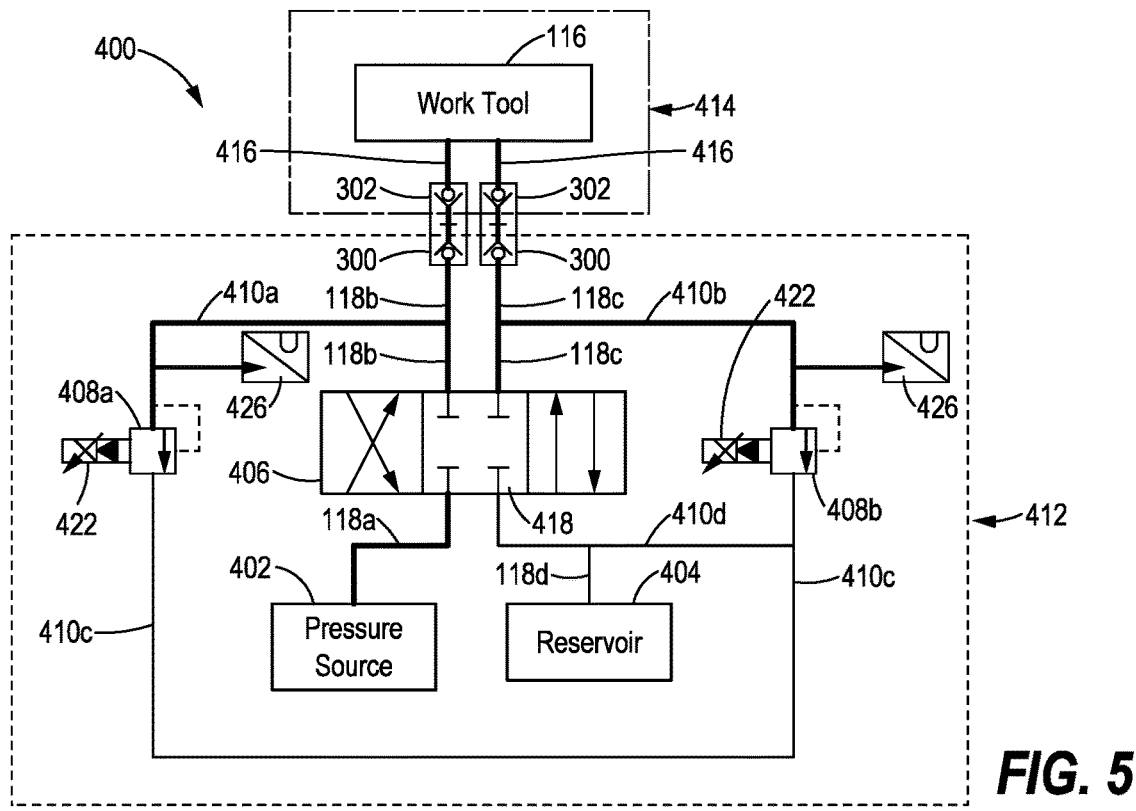
FIG. 5 is a simplified exemplary schematic diagram that illustrates a hydraulic circuit for a work machine with the work tool connected to the work machine prior to depressurization, according to an embodiment of the present disclosure.

FIG. 5 is a simplified exemplary schematic diagram that illustrates an exemplary (hydraulic) work tool auxiliary circuit 400 for a work machine 100 with the work tool 116 connected to the work machine 100 prior to depressurization and unlocking of the work tool 116 from the work machine 100. As can been seen in FIG. 5, the control valve 406 is in the blocked position 418. The hydraulic fluid in the hydraulic line 118*a* that fluidly connects the pressure source 402 to the control valve 406 and the hydraulic lines 118*b*, 118*c* that fluidly connect the control valve 406 to the quick coupler valve block 300 (of the quick coupler 114) may be under pressure. In addition, the depressurize lines 410*a*, 410*b* may be also under pressure and the tool-side hydraulic lines 416 and the passageways (not shown) that are internal to the work tool 116 itself may also be under pressure.

Block 1220 includes receiving/retrieving tool data associated with the work tool 116. The tool data may include a tool identity and/or a target pressure (associated with the work tool 116) for the work tool auxiliary circuit 400 and/or a release duration associated with the work tool 116. The release duration is the time period during which the first and/or second relief valves 408a, 408b are held open. The target pressure is the pressure in the work tool auxiliary circuit 400 (or machine-side circuit 412) at which the relief valve(s) 408a,408b close. The tool data may be received from the operator interface 122, the memory component 128 or from another source (e.g., a transmitter 124 disposed on the work tool 116 or work machine 100.)

Block 1230 includes automatically actuating, by the controller 120, in response to the unlock signal and based on the tool data associated with the work tool 116, opening of the first and/or second relief valves 408a, 408b: (a) for the release duration or (b) until the target pressure is reached in the work tool auxiliary circuit 400 or (c) to reach and maintain a target pressure in the work tool auxiliary circuit 400. Block 1230 may include regulating the pressure in the work tool auxiliary circuit 400 to the predetermined target pressure throughout the uncoupling process.

Figure 6:
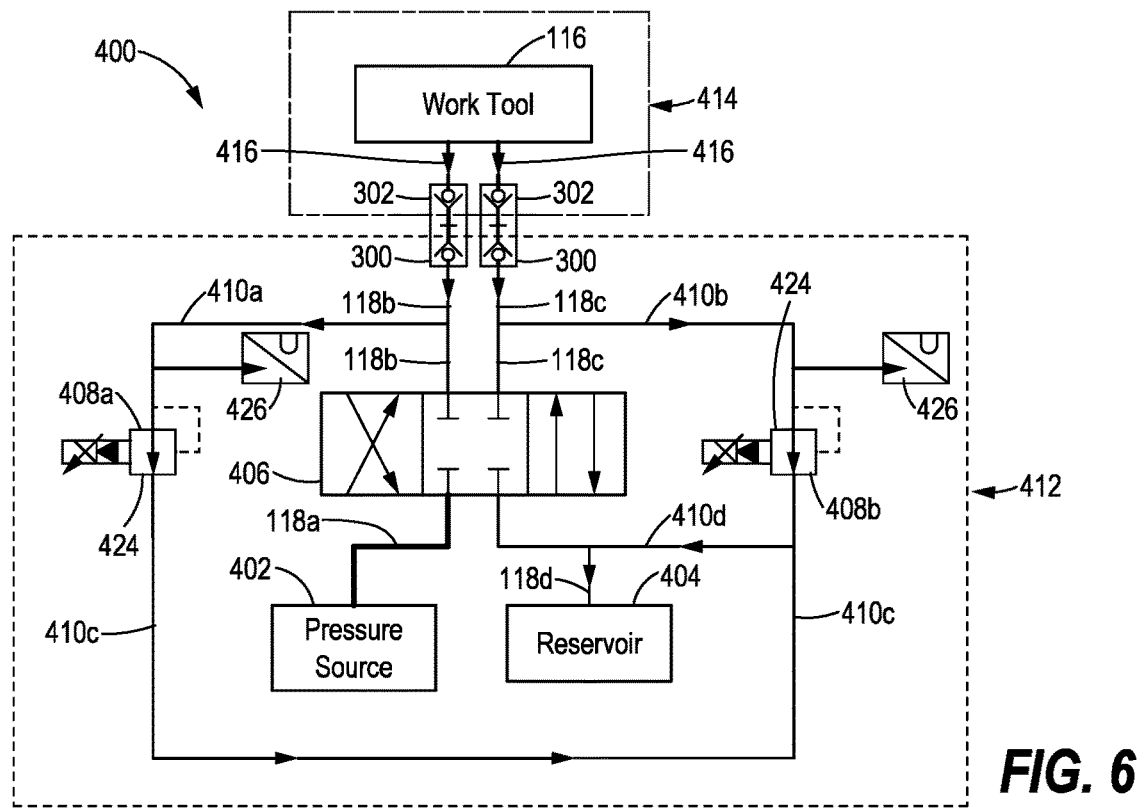
FIG. 6 is a simplified exemplary schematic diagram that illustrates a hydraulic circuit for a work machine with the work tool connected to the work machine with relief values opening during depressurization, according to an embodiment of the present disclosure.
Figure 7:
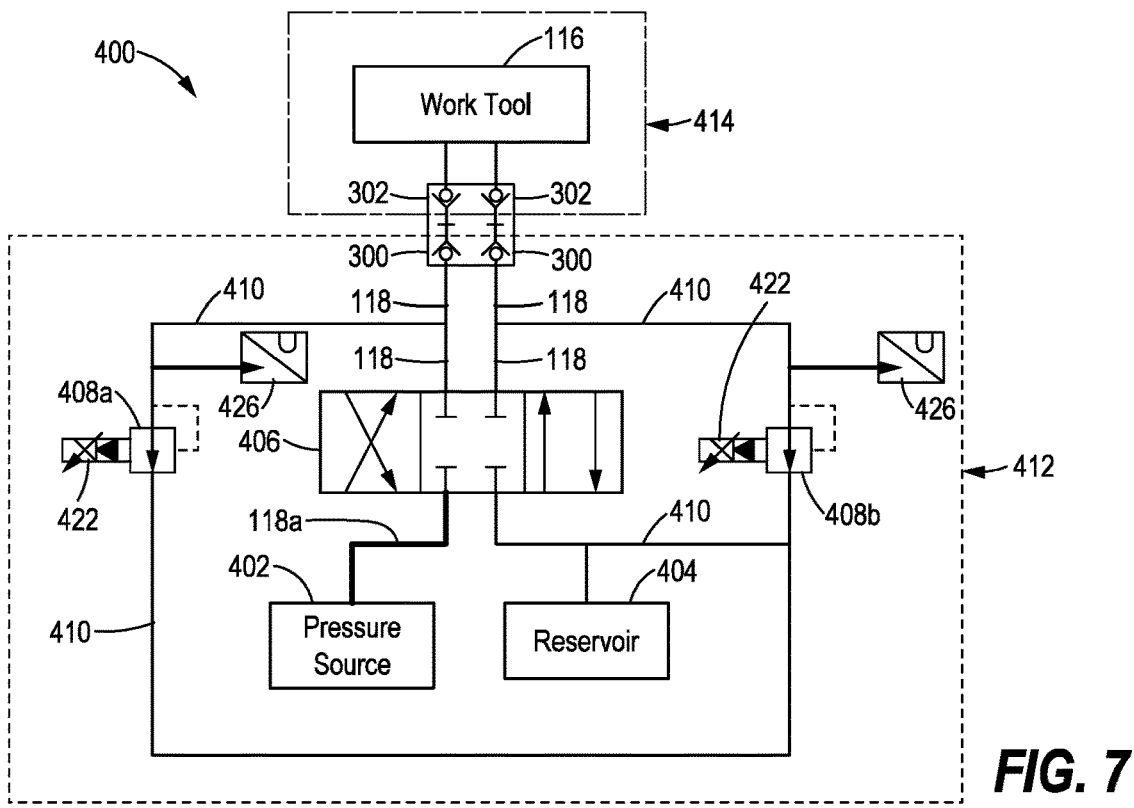
FIG. 7 is a simplified exemplary schematic diagram that illustrates pressures in the hydraulic circuit for a work machine after depressurizing and before the relief valves are moved to the closed position, according to an embodiment of the present disclosure.

FIG. 6 is a simplified exemplary schematic diagram that illustrates the hydraulic work tool auxiliary circuit 400 for the work machine 100 with the work tool 116 connected to the work machine 100 with relief values 408a, 408b open during depressurization. As can be seen in FIG. 6, when the relief valves 408a, 408b open, the hydraulic fluid drains from the hydraulic lines 118b, 118c (between the control valve 406 and the quick coupler valve block 300 (of the quick coupler 114) to the reservoir 404 and drains from the depressurize lines 410a, 410b to the reservoir 404. Hydraulic fluid also drains from the connected work tool 116 through the tool-side hydraulic lines 416, the work tool valve block 302 and quick coupler valve block 300 (of the hydraulic block 206) and hydraulic lines 118b, 118c and then through the depressurize lines 410a, 410b and relief valves 408a, 408b to the reservoir 404. FIG. 7 is a schematic diagram that illustrates a pressure in the hydraulic circuit for a work machine 100 after depressurizing (to approximately 0 pounds per square inch (psi)) and before movement of the relief valves 408a, 408b to the closed position 422 and unlocking of the hydraulic block 206. As shown in FIG. 7, the hydraulic line 118a between the pressure source 402 and the control valve 406 may remain under pressure.

For some applications, the release duration of the depressurization process may need to be limited (or the target pressure in the work tool auxiliary circuit 400 may need to be greater than 0 psi) to limit tool drift prior to disengaging the quick coupler 114. Tool drift is movement in the work tool 116 during a loss of hydraulic pressure in the work tool auxiliary circuit 400. For example, the tines on a thumb or grapple might currently being held open from the hydraulic pressure within the work tool auxiliary circuit 400. If the hydraulic circuit of the work machine 100 is depressurized, the work tool 116 may start to close or drift towards closure from the gravitational force and/or from a lack of hydraulic pressure.

Figure 8:
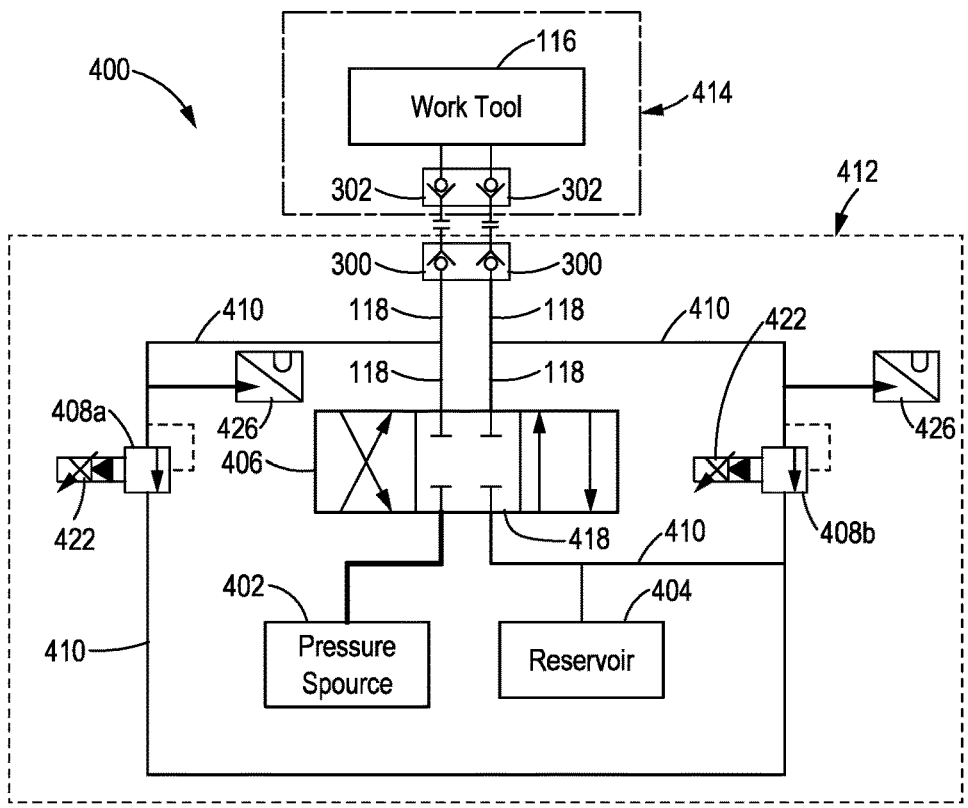
FIG. 8 is a simplified exemplary schematic diagram that illustrates pressures in the hydraulic circuit for a work machine after depressurization and removal of the work tool from the work machine, according to an embodiment of the present disclosure.

In block 1240, after the release duration has expired or when the target pressure has been reached in the work tool auxiliary circuit 400 or portion thereof (e.g., when the target pressure has been reached as measured by the pressure sensor(s) 426 disposed proximal to the relief valve(s) 408a, 408b), the method may further comprise unlocking of the quick coupler 114 from the work tool 116 by moving the lock member 306 to the unlocked position 308. When the lock member 306 is in the unlocked position 308, the work tool 116 may be free to be uncoupled from the quick coupler 114. Prior to the unlocking, during the unlocking or after the unlocking, the controller may activate movement of the relief valves 408a, 408b to the closed position 422. FIG. 8 is an exemplary schematic diagram that illustrates the work tool auxiliary circuit 400 for a work machine 100 after depressurization and removal of the work tool 116 from the work machine 100. As can be seen in FIG. 8, the machine-side circuit 412 and the tool-side circuit 414 have been depressurized.

Figure 9:
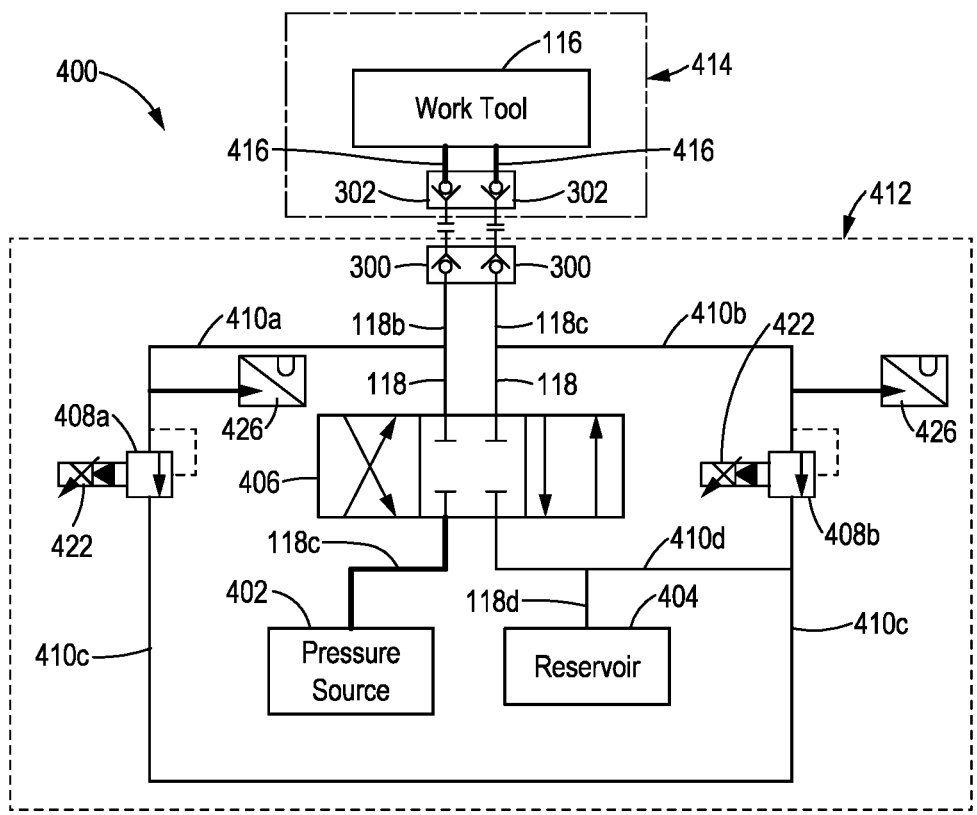
FIG. 9 is a simplified exemplary schematic diagram that illustrates pressures in the hydraulic circuit for a work machine prior to connection of a work tool that is subject to pressure from thermal expansion, according to an embodiment of the present disclosure.

FIG. 13 is an exemplary flowchart is illustrated showing sample blocks which may be followed in a method 1300 of depressurizing a work tool auxiliary circuit 400 of a work machine 100 during the process for coupling a work tool 116 to the work machine 100. FIG. 9 is a schematic diagram that illustrates pressure that may be present in the tool-side circuit 414 and in the machine-side circuit 412 (see for example, tool-side hydraulic lines 416) prior to the work tool 116 being connected to the work machine 100. The pressure shown in the tool-side circuit 414 is typically pressure from thermal expansion, although such pressure may result from other causes. Damage due to thermal expansion can occur when the work tool 116 is previously disconnected from a work machine 100 without bleeding pressure (depressurizing) from the work tool auxiliary circuit 400 prior to disconnecting the work tool 116 due to a pressure-build up within the work tool 116 that is higher than pressure tolerance of the work tool 116. For example, the work tool 116 may be capable of handling up to 3000 psi and on a cold day where the current pressure in the work tool 116 may be at 2800 psi. If an operator disconnects the work tool 116 from the work machine 100 on a cold day where the pressure within the work tool 116 is at 2800 psi and if there is a large temperature swing the following day after the work tool 116 is removed from the work machine 100, when the work tool 116 is still disconnected from the work machine 100, the pressure in the work tool 116 may increase significantly over the maximum designed pressure due to the thermal expansion of the oil that is trapped within the work tool 116. Reducing the pressure in the work tool auxiliary circuit 400 reduces the force that is required to connect the work tool valve block 302 to the quick coupler valve block 300 (hydraulic block 206) and provides an increase of ease in coupling the work tool 116 to the work machine 100.

After the work tool 116 has been picked up and connected to the quick coupler 114, the controller 120 in block 1310 receives a lock signal to lock the work tool 116 to the quick coupler 114 (by locking the quick coupler valve block 300 to the work tool valve block 302) to which the work tool 116 is presently attached. The lock signal may be received from the operator interface 122 based on user input entered into the operator interface 122 by an operator. For example, in one embodiment, the operator may flip a switch(s) within an operator station to trigger the sending of the lock signal by the operator interface 122 to the controller 120.

Block 1320 includes receiving/retrieving, by the controller 120, tool data associated with the work tool 116, the tool data may include a tool identification, and/or a target pressure (associated with the work tool 116) for the work tool auxiliary circuit 400 or a release duration (associated with the work tool 116).

At this point in the process, the control valve 406 is in the blocked position 418. Block 1330 includes automatically actuating, by the controller 120, opening of the first and second relief valves 408a, 408b: (a) for the release duration or (b) until the target pressure is reached in the work tool auxiliary circuit 400 or machine-side circuit 412 or (c) to reach and maintain the target pressure in the work tool auxiliary circuit 400 or machine-side circuit 412 before and/or during locking of the work tool 116 to the quick coupler valve block 300 via movement of the lock member(s) 306 to the locked position 310. In some embodiments, this depressurization may start when the tool-side circuit 414 is not yet fluidly connected (via the quick coupler valve block 300 and the work tool valve block 302) to the machine-side circuit 412 and continues after the tool-side circuit 414 is fluidly connected (via the quick coupler valve blocks 300 and the work tool valve block 302) to the machine-side circuit 412. The inventors have found starting depressurization prior to the fluid coupling of the quick coupler valve block 300 and the work tool valve block 302 may facilitate the coupling of such quick coupler valve block 300 and the work tool valve block 302, if the operator has accidentally pressurized the machine-side circuit 412 prior to fluid connection to the tool-side circuit 414. In other embodiments, the depressurization may start when the tool-side circuit 414 is fluidly connected to the machine-side circuit 412.

Figure 10:
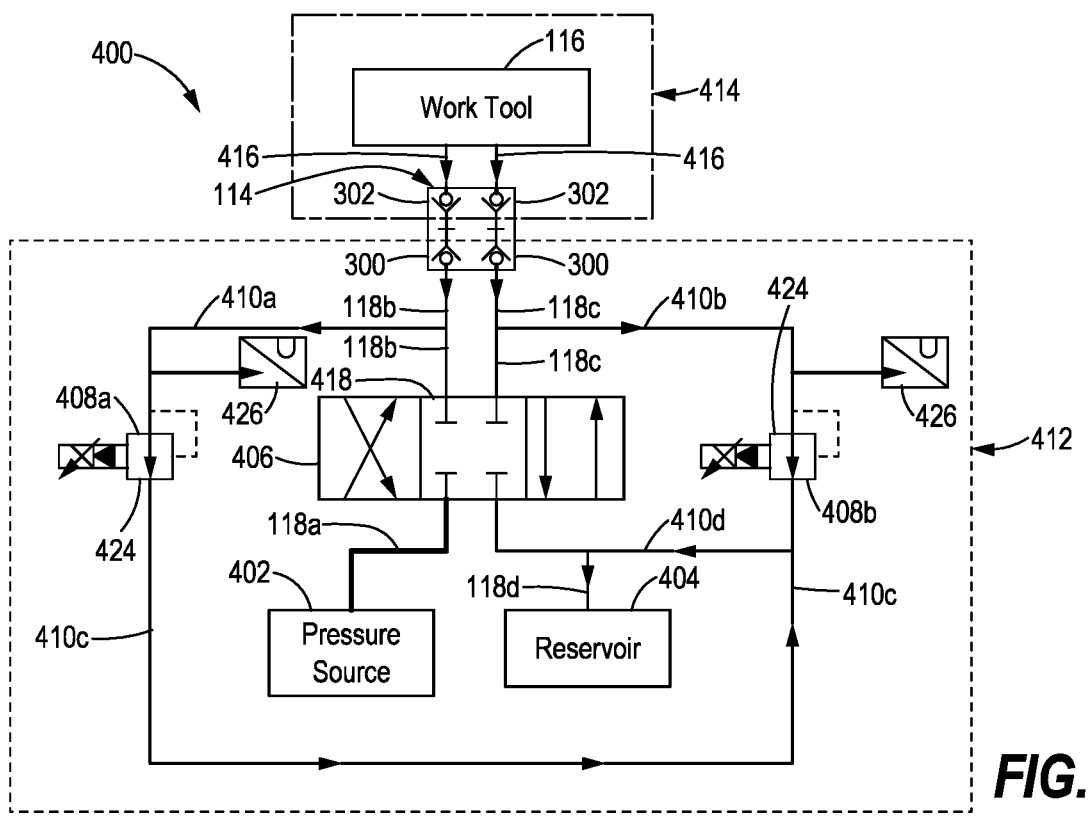
FIG. 10 is a simplified exemplary schematic diagram that illustrates pressures in the hydraulic circuit for a work machine after connection of the work tool that is the subject of FIG. 9, according to an embodiment of the present disclosure.

FIG. 10 is a schematic diagram that illustrates depressurization of the work tool auxiliary circuit 400 resulting from the opening of the relief valves 408a, 408b.

In some embodiments, a quick coupler valve block 300 and a work tool valve block 302 may make the hydraulic fluid connection before the locking. Such quick coupler valve block 300 and a work tool valve block 302 may be partially connected (enough to allow fluid to flow therethrough but the coupling process is not fully complete), or may be fully connected (coupling process fully complete and fluid free to flow therethrough). In an embodiment, in which the quick coupler valve block 300 and a work tool valve block 302 make the hydraulic connection prior to the locking process, the hydraulic fluid under internal pressure in the work tool 116 flows through the quick coupler valve block 300, the hydraulic lines 118(b-d), and the depressurization lines 410 (a-d) to the reservoir 404.

Sometimes a quick coupler valve block 300 and a work tool valve block 302 may instead be configured to make the hydraulic connection during the locking process. In an embodiment in which the hydraulic couplings 304 make the hydraulic connection during the locking process, hydraulic fluid in the hydraulic lines 118(b-d) and the depressurization lines 410 (a-d) flows to the reservoir 404. Once the hydraulic couplings 304 make the hydraulic connection, hydraulic fluid under internal pressure in the work tool 116 may flow through the quick coupler valve block 300, the hydraulic lines 118(b-d) and the depressurization lines 410 (a-d) to the reservoir 404.

Figure 11:
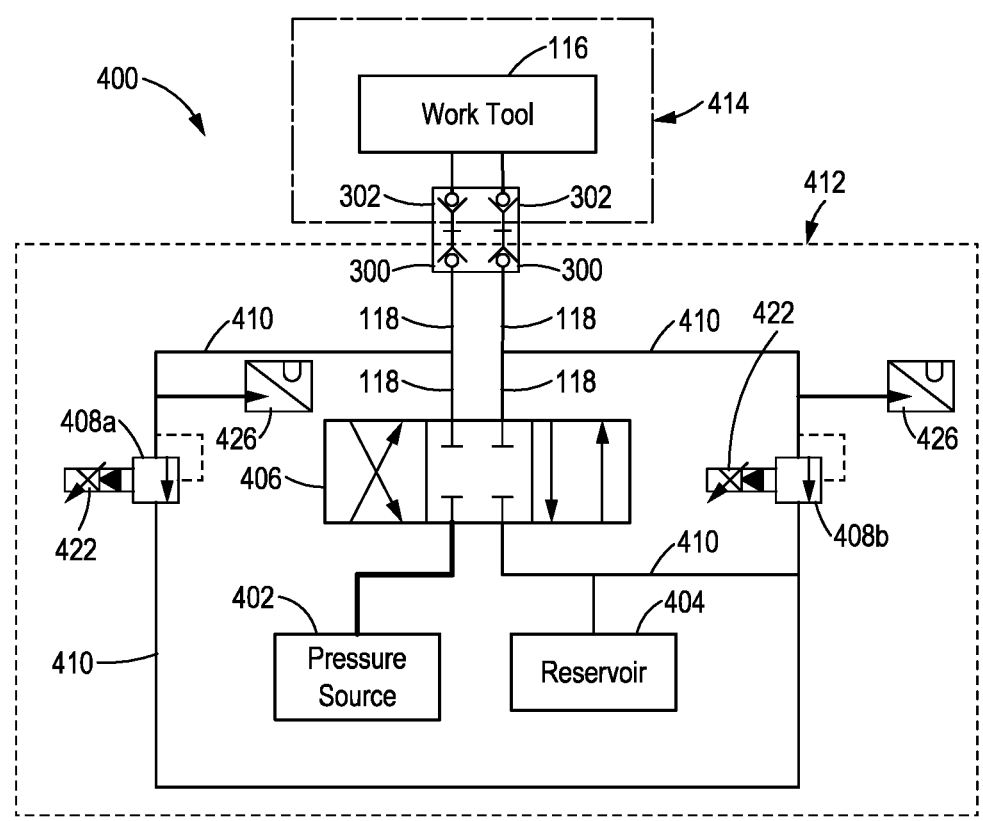
FIG. 11 is a simplified exemplary schematic diagram that illustrates pressures in the hydraulic work tool auxiliary circuit after connection of the work tool that is the subject of FIG. 9 and subsequent to depressurization, according to an embodiment of the present disclosure.

FIG. 11 is a schematic illustrating the work tool auxiliary circuit 400 after depressurization. As can be seen in the embodiment illustrated in FIG. 11, opening of the relief valves 408a, 408b reduces or removes internal pressure from the tool-side circuit 414 and the machine-side circuit 412 (e.g., the quick coupler valve block 300, the hydraulic lines 118(b-d), and the depressurization lines 410(a-d). In an embodiment, the hydraulic line 118a between the pressure source 402 and the control valve 406 may still be under pressure.

Block 1340 includes, after the release duration has expired or when the target pressure has been reached in the work tool auxiliary circuit 400, locking of the quick coupler 114 to the work tool 116. In some embodiments, the controller may continue to regulate the pressure in the work tool auxiliary circuit 400 after the target pressure is reached by adjusting the opening of the first and/or second relief valves 408a, 408b. In an embodiment, the lock member 306 of the quick coupler 114 is moved from the unlocked position 308 to the locked position 310 to lock the quick coupler 114 and the work tool 116 together. As discussed earlier in some embodiments, a quick coupler valve block 300 and work tool valve block 302 make the fluid connection during the locking of one or more of the locking member(s). Also, for quick coupler valve block 300 and a work tool valve block 302 that make the fluid connection before the locking process, the quick coupler valve block 300 and a work tool valve block 302 may be partially connected which allows for flow to pass, but may not be fully connected. Allowing depressurization during the locking process facilitates full seating of the quick coupler valve block 300 and work tool valve block 302 to enable a good sealing fit.

From the foregoing, it can be seen that the technology disclosed herein has industrial applicability in a variety of settings such as, but not limited to work machines 100 in the construction and agricultural industries that utilize a quick coupler 114 for connecting to various work tools 116.

What is claimed is:

1. A control system for depressurizing a work tool auxiliary circuit fluidly connecting a work machine and a work tool that is coupled to the work machine by a quick coupler, the work tool including a work tool valve block, the quick coupler including a quick coupler valve block and a lock member movable between a locked position and an unlocked position, when in the locked position the work tool valve block and quick coupler valve block are mated and in fluid communication, when in the unlocked position the work tool valve block and quick coupler valve block are disconnectable, the work tool auxiliary circuit having a machine-side circuit including the quick coupler valve block, a reservoir and a relief valve fluidly connected to the quick coupler valve block and to the reservoir, and having a tool-side circuit including the work tool valve block and the work tool, the system comprising:
   a controller configured to
      receive an unlock signal for the work tool;
      receive tool data associated with the work tool, the tool data including a target pressure for the work tool auxiliary circuit or a release duration for the relief valve; and
      in response to the unlock signal and the tool data, automatically actuate opening of the relief valve (a) for the release duration or (b) until the target pressure is reached in the work tool auxiliary circuit or machine-side circuit or (c) to reach and maintain the target pressure in the work tool auxiliary circuit or machine-side circuit.

2. The control system according to claim 1, wherein the relief valve is a solenoid pressure release valve.

3. The control system according to claim 1 in which the controller is further configured to activate movement of the lock member to the unlocked position, the control system further comprising:
   an operator interface in communication with the controller, the operator interface configured to receive a user input, wherein the unlock signal is received by the controller from the operator interface and is based on the user input.

4. The control system according to claim 1, in which the controller is further configured to:
   receive a lock signal for the work tool;
   receive the tool data associated with the work tool;
   automatically actuate, by the controller, opening of the relief valve (a) for the release duration or (b) until the target pressure is reached in the work tool auxiliary circuit or machine-side circuit or (c) to reach and maintain the target pressure in the work tool auxiliary circuit or machine-side circuit; and activate movement of the lock member from the unlocked position to the locked position to lock the work tool valve block to the quick coupler valve block.

5. The control system according to claim 4, wherein the opening of the relief valve drains hydraulic fluid from the work tool to the reservoir.

6. The control system according to claim 1, wherein the tool data is received by the controller from an operator interface and a pressure of the work tool auxiliary circuit or machine-side circuit is received from a pressure sensor upstream of the relief valve.

7. The control system according to claim 1 further comprising a transmitter in communication with the controller, wherein the tool data is received by the controller from a transmitter mounted on the work tool.

8. A method of depressurizing a work tool auxiliary circuit fluidly connecting a work machine and a work tool that is coupled to the work machine by a quick coupler, the work tool including a work tool valve block, the quick coupler including a quick coupler valve block and a lock member movable between a locked position and an unlocked position, the work tool auxiliary circuit having a machine-side circuit including the quick coupler valve block, a reservoir and a first relief valve fluidly connected to the quick coupler valve block and to the reservoir, and having a tool-side circuit including the work tool valve block and the work tool, the method comprising:
receiving an unlock signal for the work tool;
receiving tool data associated with the work tool, the tool data including a target pressure for the work tool auxiliary circuit or a release duration for the first relief valve;
in response to the unlock signal and the tool data, automatically actuating, by a controller, opening of the first relief valve (a) for the release duration or (b) until the target pressure is reached in the work tool auxiliary circuit or machine-side circuit or (c) to reach and maintain the target pressure in the work tool auxiliary circuit or machine-side circuit; and
moving the lock member to the unlocked position.

9. The method according to claim 8, wherein the first relief valve is a solenoid pressure release valve.

10. The work machine according to claim 9, wherein the tool data is received by the controller from an operator interface in operable communication with the controller.

11. The method according to claim 8, wherein the automatically actuating the opening of the first relief valve occurs until the target pressure is reached in the work tool auxiliary circuit.

12. The method according to claim 8, wherein the unlock signal is received by the controller from an operator interface in operable communication with the controller.

13. The work machine according to claim 8, in which the machine-side circuit of the work tool auxiliary circuit further includes a second relief valve fluidly connected to the quick coupler valve block and to the reservoir, and the automatically actuating, by the controller, further includes opening of the second relief valve for the release duration or until the target pressure is reached in the work tool auxiliary circuit.

14. A method of depressurizing a work tool auxiliary circuit fluidly connecting a work machine and a work tool that is coupled to the work machine by a quick coupler, the work tool including a work tool valve block, the quick coupler including a quick coupler valve block and a lock member movable between a locked position and an unlocked position, the work tool auxiliary circuit having a machine-side circuit including the quick coupler valve block, a reservoir and a first relief valve fluidly connected to the quick coupler valve block and to the reservoir, and having a tool-side circuit including the work tool valve block and the work tool, the method comprising:
receiving a lock signal for the work tool;
receiving tool data associated with the work tool, the tool data including a target pressure for the work tool auxiliary circuit or a release duration for the first relief valve;
automatically actuating, by a controller, opening of the first relief valve: (a) for the release duration or (b) until the target pressure is reached in the work tool auxiliary circuit or machine-side circuit or (c) to reach and maintain a target pressure in the work tool auxiliary circuit or machine-side circuit before and/or during locking of the quick coupler to the work tool via movement of the lock member to the locked position; and
moving the lock member from the unlocked position to the locked position to lock the quick coupler to the work tool.

15. The method according to claim 14, wherein the first relief valve is a solenoid pressure release valve.

16. The method according to claim 14, wherein the automatically actuating the opening of the first relief valve occurs until the target pressure is reached in the work tool auxiliary circuit.

17. The method according to claim 14, wherein the lock signal is received by the controller from an operator interface in operable communication with the controller.

18. The method according to claim 14, wherein the tool data is received by the controller from an operator interface in operable communication with the controller.

19. The method according to claim 14, in which the machine-side circuit of the work tool auxiliary circuit further includes a second relief valve fluidly connected to the quick coupler valve block and to the reservoir, and the automatically actuating, by the controller, further includes opening of the second relief valve for (a) the release duration or (b) until the target pressure is reached in the work tool auxiliary circuit or machine-side circuit or (c) to reach and maintain a target pressure in the work tool auxiliary circuit or machine-side circuit before and/or during locking of the quick coupler to the work tool via movement of the lock member to the locked position.

20. The method according to claim 14, wherein the work machine is an excavator.

* * * * *